(12) United States Patent
Kizaki et al.

(10) Patent No.: US 8,218,115 B2
(45) Date of Patent: Jul. 10, 2012

(54) LIQUID CRYSTAL DISPLAY DEVICE COMPRISING A PIXEL ELECTRODE HAVING A REVERSE TAPER SHAPE WITH AN EDGE PORTION THAT FORMS A TRANSITION NUCLEUS IN A LIQUID CRYSTAL LAYER

(75) Inventors: Yukio Kizaki, Kawasaki (JP); Rei Hasegawa, Yokohama (JP); Yuko Kizu, Yokohama (JP); Hirofumi Wakemoto, Kanazawa (JP); Kenji Nakao, Kanazawa (JP); Tetsuo Fukami, Ishikawa-gun (JP); Tetsuya Kojima, Ishikawa-gun (JP)

(73) Assignees: Kabushiki Kaisha Toshiba, Tokyo (JP); Toshiba Matsushita Display Technology Co., Ltd., Tokyo (JP)

( * ) Notice: Subject to any disclaimer, the term of this patent is extended or adjusted under 35 U.S.C. 154(b) by 650 days.

(21) Appl. No.: 12/211,964

(22) Filed: Sep. 17, 2008

(65) Prior Publication Data
US 2009/0079925 A1    Mar. 26, 2009

(30) Foreign Application Priority Data
Sep. 26, 2007 (JP) ................ 2007-249908

(51) Int. Cl.
G02F 1/1333 (2006.01)
G02F 1/1337 (2006.01)

(52) U.S. Cl. .................. 349/138; 349/125
(58) Field of Classification Search .......... 349/33, 349/34, 138, 139, 168, 169, 125
See application file for complete search history.

(56) References Cited

U.S. PATENT DOCUMENTS

| | | | |
|---|---|---|---|
| 2001/0019247 A1* | 9/2001 | Tsukamoto | 315/169.3 |
| 2005/0190322 A1* | 9/2005 | Okabe et al. | 349/113 |
| 2006/0114395 A1* | 6/2006 | Kwon | 349/139 |
| 2008/0192194 A1 | 8/2008 | Kizu et al. | |

FOREIGN PATENT DOCUMENTS

| | | |
|---|---|---|
| JP | 2003-280036 | 10/2003 |
| JP | 2006-154797 | 6/2006 |

OTHER PUBLICATIONS

U.S. Appl. No. 12/236,868, filed Sep. 24, 2008, Nakao, et al.
U.S. Appl. No. 12/211,940, filed Sep. 17, 2008, Kizaki, et al.

* cited by examiner

*Primary Examiner* — Mark Robinson
*Assistant Examiner* — Paul Lee
(74) *Attorney, Agent, or Firm* — Oblon, Spivak, McClelland, Maier & Neustadt, L.L.P.

(57) ABSTRACT

After supply of power, a liquid crystal display device performing transition from a first state to a second state different from the first state before a display operation is provided with a transition nucleus forming portion around a pixel electrode or inside. The transition nucleus forming portion performs transition to the second state prior to other portion during a transition drive period. The transition nucleus forming portion of the pixel electrode has an edge portion formed into a reverse taper shape decreasing in its thickness toward the tip end. Therefore, transition from a splay alignment to a bend alignment is performed with simple element and drive circuit configuration in all pixels.

8 Claims, 7 Drawing Sheets

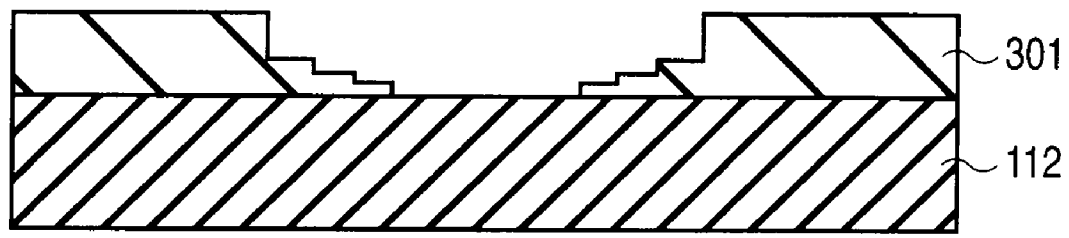
F I G. 8A
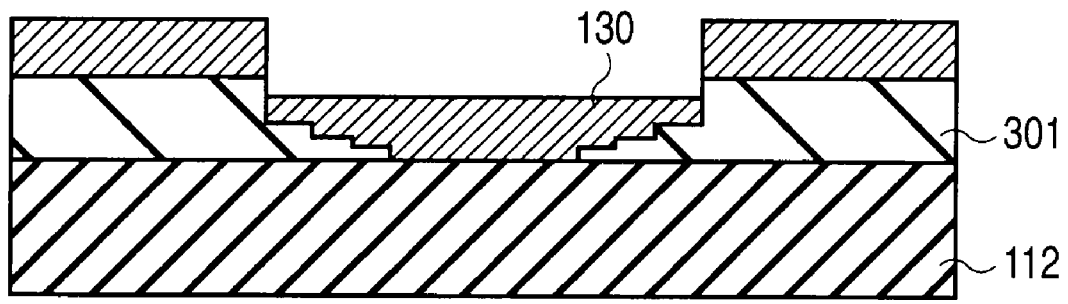
F I G. 8B
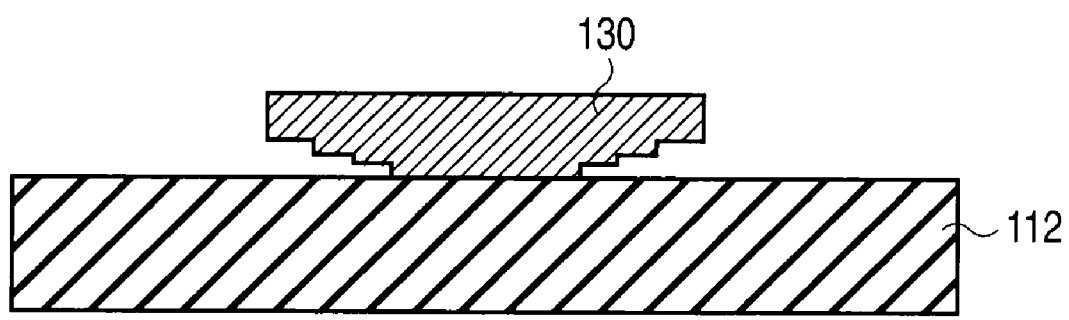
F I G. 8C

LIQUID CRYSTAL DISPLAY DEVICE COMPRISING A PIXEL ELECTRODE HAVING A REVERSE TAPER SHAPE WITH AN EDGE PORTION THAT FORMS A TRANSITION NUCLEUS IN A LIQUID CRYSTAL LAYER

CROSS-REFERENCE TO RELATED APPLICATIONS

This application is based upon and claims the benefit of priority from prior Japanese Patent Application No. 2007-249908, filed Sep. 26, 2007, the entire contents of which are incorporated herein by reference.

BACKGROUND OF THE INVENTION

1. Field of the Invention

The present invention relates to a liquid crystal display device having a display mode using birefringence. In particular, the present invention relates to a liquid crystal display device having a display mode of forming a bend alignment in a liquid crystal material.

2. Description of the Related Art

Recently, a liquid crystal display device having an optically compensated bend (OCB) mode has attracted interests. In the liquid crystal display device, bend alignment is formed in a liquid crystal material, and a tilt angle of liquid crystal molecule is changed in the vicinity of each orientation film. In this way, retardance of a liquid crystal layer is changed.

According to the foregoing OCB mode, a bend alignment is essentially required as described above. However, it is difficult to stably obtain the bend alignment as described in the following.

In an initial state before power tune on, liquid crystal material forms a splay alignment. This is because the splay alignment is inherently stable as compared with the bend alignment. When the display device is started, an operation for making a transition from the splay alignment to the bend alignment is required. In order to develop the foregoing transition, energy more than state energy difference between bend and splay alignments needs to be given. Usually, voltage is applied to a liquid crystal cell, and thereby, given thereto in the form of electrostatic energy. According to the voltage application equivalent to energy difference, the progress of the foregoing transition is late; for this reason, very high voltage must be actually applied. The transition progress is easy to receive an influence by a shape of a substrate surface or electric field distribution. As a result, a non-transferred area remains in the liquid crystal layer.

JP-A2003-280036 (KOKAI) discloses the technique to solve the foregoing problem. According to the technique, an insert-die shaped bend pattern (hereinafter, referred to as transition nucleus forming portion) is provided around neighboring pixels. Potential difference is given between electrodes, and simultaneously, potential difference is given between counter electrodes. In this way, heavy distortion of liquid crystal alignment is generated in the thickness and inner-face direction of the liquid crystal cell. Thus, transition from splay alignment to bend alignment is made at high speed. The foregoing Publication JP-A2003-280036 (KOKAI) discloses a liquid crystal display device. In the liquid crystal display device, the transition nucleus forming portion is composed of a pixel electrode and a close electrode connected to a neighboring pixel electrode adjacent to the pixel electrode via a switching element. Potential difference equivalent to image signal amplitude is given between pixel electrodes, and simultaneously, potential difference is given between counter electrodes. In the liquid crystal display device, heavy liquid crystal alignment distortion is generated in the thickness direction and the in-plane direction of liquid crystal cell. A potential (voltage) change is prevented by capacitance coupling between the pixel electrode and a circumferential wiring to make a transition from a splay alignment to a bend alignment at high speed. According to the technique disclosed in the Publication JP-A2003-280036 (KOKAI), the transition nucleus forming portion is formed to be positioned just on a peripheral wiring electrode. Thus, numerical aperture and contrast can be kept higher.

In the liquid crystal display device disclosed in the Publication JP-A2003-280036 (KOKAI), different potential must be set to a counter electrode, individual pixel electrodes and proximity electrode at predetermined timing to realize high-speed transition. For this reason, a complicated drive control circuit is required. In order to configure a pixel using the proximity electrode, two switching elements are required per pixel. Thus, there is a problem that each configuration of an element structure and a drive circuit becomes complicated. Potential difference given to between neighboring pixels or between a pixel and the proximity electrode is set to a value equivalent to image signal amplitude (usually, 10V or less). If the foregoing potential difference is given, the field strength in the in-plane direction of the liquid crystal cell is short; as a result, a transition operation becomes unstable.

BRIEF SUMMARY OF THE INVENTION

According to one aspect of the invention, there is provided a liquid crystal display device comprising:

a first substrate structure including a first insulating substrate, a first electrode, a second electrode arranged between the first insulating substrate and the first insulating substrate, and an insulating base layer disposed on the second electrode, on which the first electrode is formed, wherein the first electrode has a flat surface facing the third electrode and an edge portion which is a reverse taper shape gradually decreasing in its thickness toward the tip end;

a second substrate structure including a second insulating substrate, and a third electrode arranged on the second insulating substrate; and a liquid crystal layer held between the first electrode and the third electrode, the liquid crystal layer being subject to a phase transition from a first state to a second state when an initialization voltage is applied to the first to third electrodes, the edge portion of the first electrode forming a transition nucleus in the liquid crystal layer based on application of the initialization voltage.

BRIEF DESCRIPTION OF THE SEVERAL VIEWS OF THE DRAWING

FIGS. 8A, 8B and 8C are schematic views sowing a manufacturing method according to the invention.

DETAILED DESCRIPTION OF THE INVENTION

Figure 1:
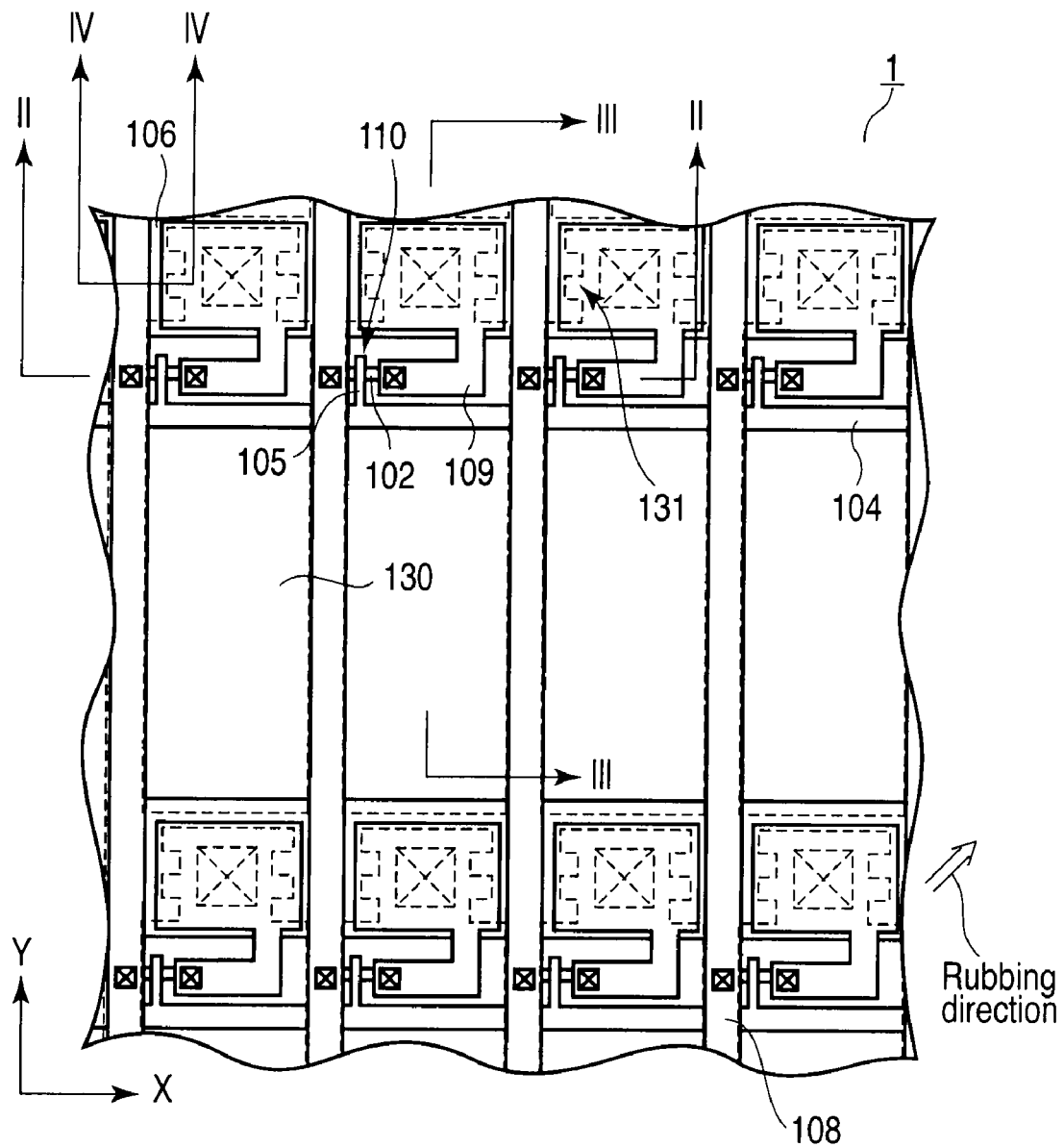
FIG. 1 is a top plan view schematically showing a liquid crystal display device according to one embodiment of the invention.

A liquid crystal display device according to one embodiment of the invention will be hereinafter described with reference to the accompanying drawings. In the following drawings, the same reference numerals are used to designate the constituent components having the same or similar function, and the details are omitted.

Figure 2:
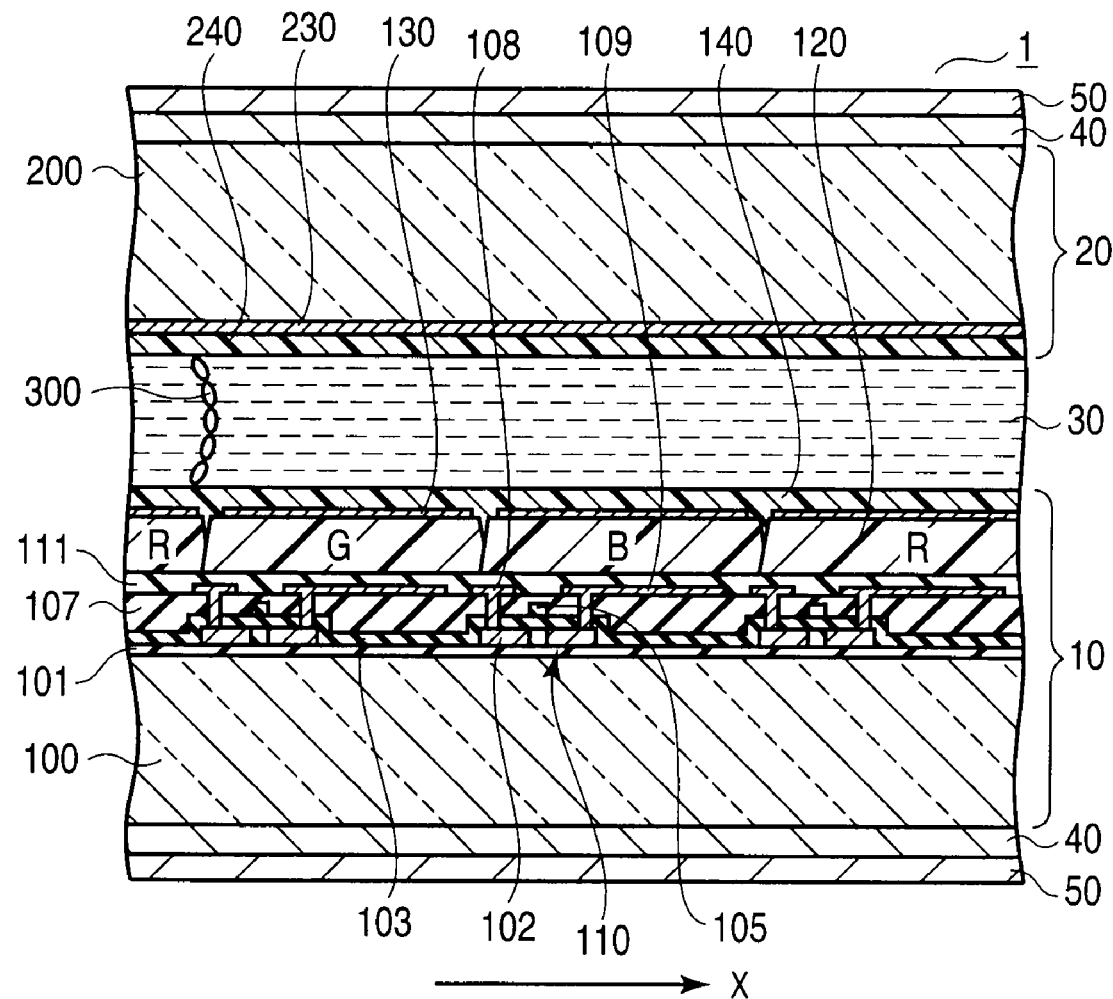
FIG. 2 is a cross-sectional view showing the liquid crystal display device shown in FIG. 1 taken along the line II-II.
Figure 3:
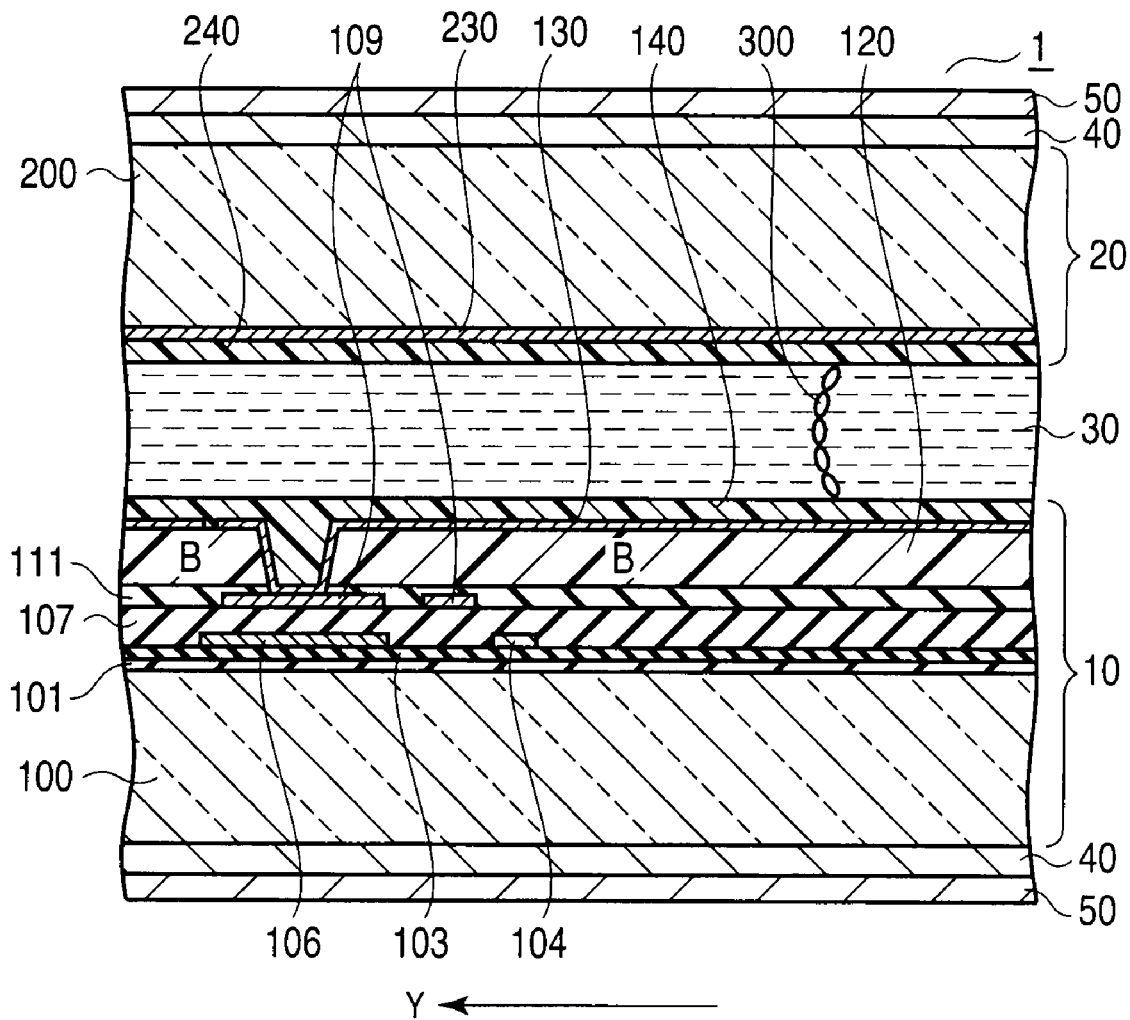
FIG. 3 is a cross-sectional view showing the liquid crystal display device shown in FIG. 1 taken along the line III-III.

FIG. 1 is a top plan view schematically showing a liquid crystal display device according to the invention. FIG. 2 is a cross-sectional view showing the liquid crystal display device taken along the line II-II shown in FIG. 1. FIG. 3 is a cross-sectional view showing the liquid crystal display device taken along the line III-III shown in FIG. 1. In FIG. 1, it is noted that a color filter described later is not illustrated.

The liquid crystal display device is an OCB mode active matrix type liquid crystal display device. The OCB mode active matrix type liquid crystal display device includes a liquid crystal panel 1 and a back light (not shown) arranged facing the liquid crystal display panel 1. The liquid crystal display device further includes a scanning line driver (not shown) and a signal line driver (not shown) for driving the liquid crystal display panel 1.

As shown in FIG. 2 and FIG. 3, a liquid crystal display panel 1 includes an array substrate, that is, a backside substrate 10 and a front substrate 20. The front substrate 20 is used as a substrate facing the backside substrate 10. A frame-like bonding agent layer (not shown) is interposed between the backside substrate 10 and the front substrate 20. A gap is formed between the backside substrate 10 and the front substrate 20. The gap formed between the backside substrate 10 and the front substrate 20, that is, a gap surrounded by the bonding agent layer is filled with a liquid crystal material. The liquid crystal material forms a liquid crystal layer 30. As shown in FIG. 2 and FIG. 3, an optical compensation film 40 and a polarizer 50 are successively stacked on the outer surface of the backside substrate 10 and the front substrate 20.

The backside substrate 10 comprises a transparent substrate 100 such as glass substrate, for example. An under coat layer 101 such as SiNx layer and/or SiO$_2$ layer is formed on the transparent substrate 100. A semiconductor layer 102 such as polysilicon layer formed with a channel and source/drain is provided on the under coat layer 101. The semiconductor layer 102 and the under coat layer 101 is covered with a gate insulating film 103. The gate insulating film 103 is formed using tetraethoxyorthosilane (TEOS).

A scanning line shown in FIG. 1 and FIG. 3, a gate electrode shown in FIG. 1 and FIG. 2 and a reference wiring 106 shown in FIG. 1 and FIG. 3 are arranged in parallel.

The scanning line 104 is extended to a first direction, and arrayed along a second direction crossing the first direction. In FIG. 1, the scanning line extends to the horizontal or X direction equivalent to a row direction and is arrayed in a Y direction equivalent to the longitudinal or column direction.

A metal material is usable as the scanning line 104. For example, MoW is usable as the material of the scanning line 104. The scanning line 104 is connected to a scanning line driver (not shown), and driven according to a scan signal supplied from the scanning line driver.

As seen from FIG. 1, the gate electrode 105 is formed as a projected portion, which is formed in such a manner that a part of the scanning line 104 is extended along the Y direction. As shown in FIG. 2, the gate electrode 105 faces the channel formed in the semiconductor layer 102 via the gate insulating film 103. The foregoing gate electrode 105, gate insulating film and semiconductor layer 102 form a thin film transistor as a switching element 110 arranged in the vicinity of an intersection of the scanning line 104 and a signal line 108 described later.

In this case, the thin film transistor is given as the switching element 110. For example, other elements such as a diode or metal-insulator-metal (MIM) may be used.

As seen from FIG. 1, the reference wiring 106 is extended to the X direction, and arrayed in the Y direction crossing the X direction. In this case, one reference wiring 106 is provided every the scanning line 104. Metal material is usable as the reference wiring 106; for example, MoW is usable. The reference wiring 106 is formable in the same process as the scanning line 104.

The foregoing gate insulating film 103, scanning line 104, gate electrode and reference wiring 106 are covered with an interlayer insulating film 107 as shown in FIG. 2 and FIG. 3. For example, SiO$_2$ and/or SiNx, acrylate resin is usable as the interlayer insulating film 107. A signal line 108 and a drain electrode 109 are arranged on the interlayer insulating film 107 as shown in FIG. 1 and FIG. 2.

The signal line 108 is extended to the second direction, and arrayed in the first direction. In FIG. 1, the signal line 108 is extended to the Y direction, and arrayed in the X direction. A metal material is usable as the signal line 108. For example, the signal line 108 can employ a three-layer structure of Mo layer, Al—Nd layer and Mo layer. The signal line 108 is connected to a signal line driver (not shown), and an image signal from the signal driver is supplied to the signal line 108.

According to this embodiment, the thin film transistor is used as the switching element 110, and as shown in FIG. 2, the signal line 108 is connected to the drain of the thin film transistor via a through hole formed in the interlayer insulating film 107. In other words, the signal line 108 is used as the drain electrode.

As depicted in FIG. 1 and FIG. 2, one terminal of the drain electrode 109 is connected to the source of a thin film transistor 110 via a through hole formed in the interlayer insulating film 107. The other terminal of the drain electrode 109 is formed in an electrode area facing the reference wiring 106 via the interlayer insulating film 107 as shown in FIG. 1 and FIG. 3. According to the foregoing structure, the drain electrode 109, the reference wiring 106 and the interlayer insulating film form a capacitor. For example, the same material as the signal line is usable for the drain electrode 109.

The foregoing interlayer insulating film 107, signal line 108 and drain electrode 109 are covered with an insulating base layer or foundation layer 112. In this case, the insulating base layer 112 may be formed of at least one of a passivation film 111 or a color filter 120.

The passivation film 111 covers the interlayer insulating film 107, the signal line 108 and the drain electrode 109 as seen from FIG. 2 and FIG. 3. For example, SiNx, transparent acrylate resin, benzocyclobutane (BCB), photosensitive polyimide and epoxy resin are usable as the passivation film 111. In particular, the transparent acrylate resin is preferable on patterning characteristic and cost.

The color filter is composed of a plurality of colored layers having different absorption spectrum, for example, green colored layer G, blue colored layer B and red colored layer R. These colored layers G, B and R have a band shape extending to the Y direction as seen from FIG. 3. These colored layers are arrayed along the X direction to form a stripe pattern. As shown in FIG. 2, the boundary between the colored layers G, B and R is arranged to be positioned on the signal line 108. For example, mixture of transparent resin and dye and/or pigment is usable as the colored layers G, B and R. In this case, the color filter 120 is provided in the backside substrate 10. The color filter 120 may be provided in the front substrate 20.

As shown in FIG. 1 to FIG. 3, a pixel electrode 130 is arrayed on the color filter 120 to correspond to the thin film transistor 110. The pixel electrode comprises indium tin oxide (ITO), indium zinc oxide (IZO), tin oxide doped with antimony and fluorine or a transparent conductor such as organic conductive polymer. These pixel electrodes 130 are connected to the drain electrode 109 via the passivation film 111 and the through hole formed in the color filter 120 as seen from FIG. 1 to FIG. 3.

The pixel electrode 130 and the color filter 120 are covered with an orientation film 140. For example, a resin such as polyimide is usable as the material for the orientation film 140. A rubbing alignment layer treatment is carried out with respect to the orientation film 140. According to the alignment treatment, a rise angle of liquid crystal molecule 300 on a film surface is determined; for example, rubbing treatment is selected. If the rubbing treatment is carried out as the alignment treatment, in FIG. 1, an angle shown by an arrow is set as a rubbing angle.

As illustrated in FIG. 1, the pixel electrode 130 is formed to have a rectangular shape extending to the Y direction. The end portion of the pixel electrode 130 is formed with a transition nucleus forming portion 131 in the Y direction. The transition nucleus forming portion 131 is equivalent to a boundary area contacting with a neighboring pixel electrode 130 in the Y direction, and formed to overlap with the drain electrode 109. The shape of the transition nucleus forming portion may be a bend pattern crossing a rubbing angle. For example, a comb teeth pattern, a combination of different shape pattern or a chain pattern may be employed. In FIG. 1, there is shown a continuous square pattern crossing the rubbing angle at an angle of 45°.

Figure 4:
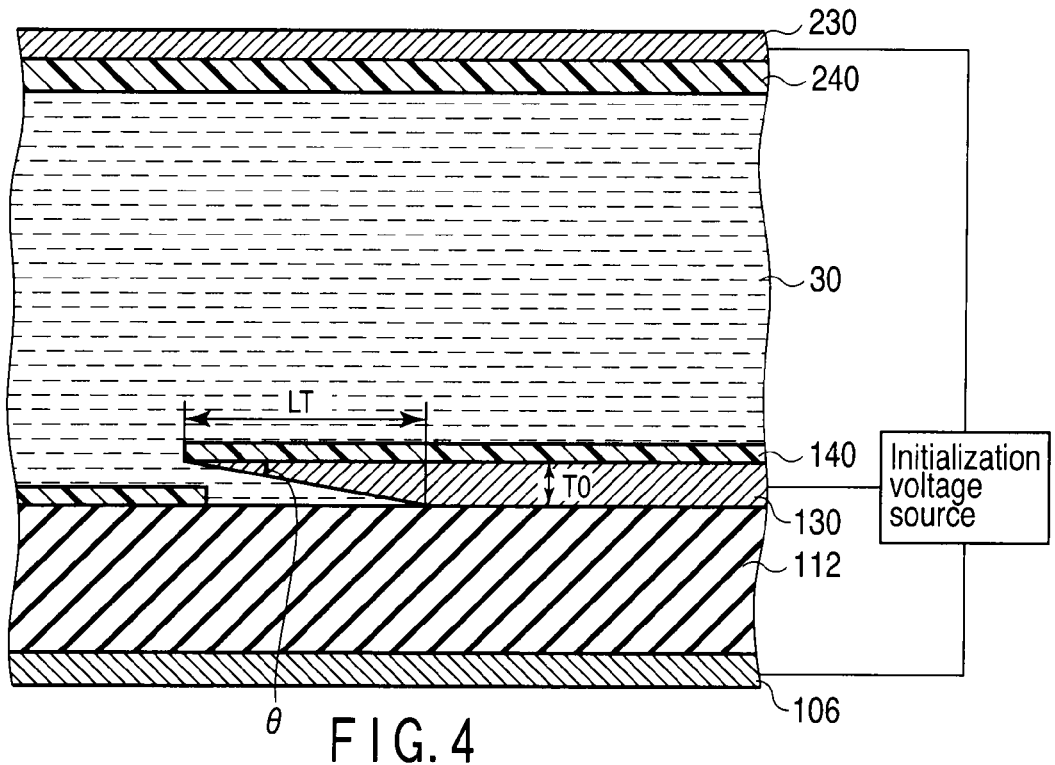
FIG. 4 is an enlarged cross-sectional view showing the sectional structure of the liquid crystal display device shown in FIG. 1 taken along the line IV-IV.

FIG. 4 is an enlarged cross-sectional view taken along the line IV-IV shown in FIG. 1. As shown in FIG. 4, the transition nucleus forming portion 131 on the pixel electrode 130 is formed into a reverse taper shape. Specifically, the upper surface of the pixel electrode 130 facing the liquid crystal layer 30 is kept flat, and the edge portion thereof is made thin gradually toward the tip end in its thickness. An edge-shaped space is formed between the edge portion of the pixel electrode 130 and the insulating base layer 112. Liquid crystal of the liquid crystal layer 30 comes into the edge-shaped space. An edge angle θ is set to 10 degrees or more and 60 degrees or less. The pixel electrode 130 is formed to have a thickness of 500 Å to 5000 Å considering a range suitable to transmittance and a resistance value. The thickest portion on the center portion is defined as the thickness T0 of the pixel electrode 130, and not the edge portion. In FIG. 4, a taper length LT is calculated from a trigonometric function based on the thickness of the pixel electrode 130 and a range of the edge angle θ. As a result, the taper length LT is set to 290 Å to 28000 Å. If the taper length LT is short, the edge-shaped space formed between the edge portion of the pixel electrode 130 and the insulating base layer 112 becomes small. For this reason, liquid crystal of the liquid crystal layer 30 does not come into the edge-shaped space. Thus, the effect of the present invention is not realized. Conversely, if the taper length LT is long, it is difficult to form a taper shape, and thus, this is a factor of increasing the cost. A preferable range of the taper length LT is 1000 Å to 5000 Å. In FIG. 4, the color filter 120 is provided on the front substrate 20, and not the backside substrate 10, and the pixel electrode 130 is formed on the insulating base layer 112.

Figure 5:
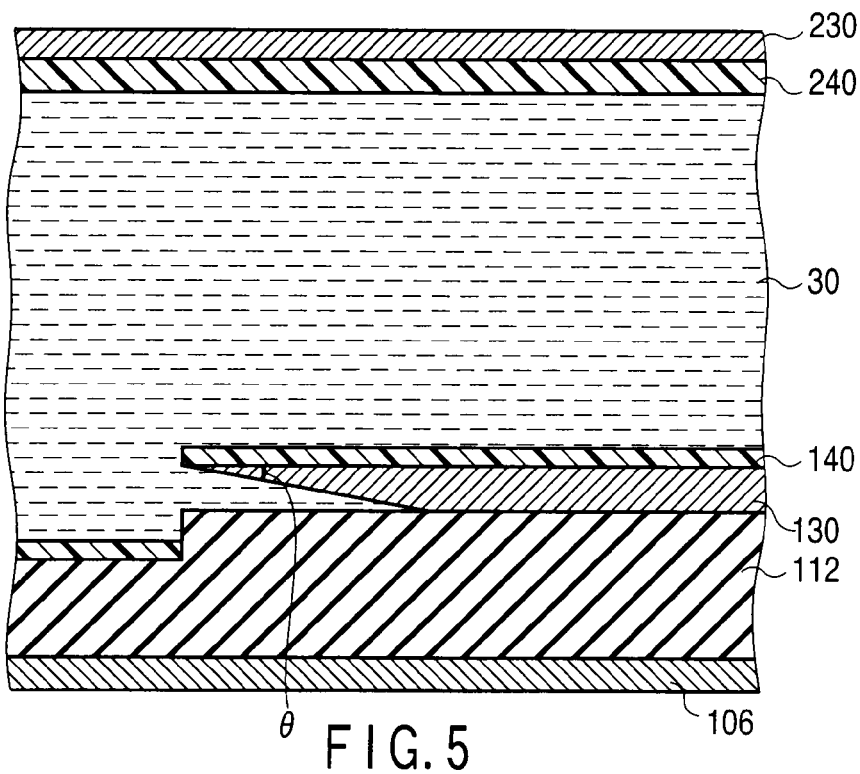
FIG. 5 is a cross-sectional view schematically showing the structure of a counter electrode shown in FIG. 4 and its surrounding areas according to a modified embodiment.
Figure 6:
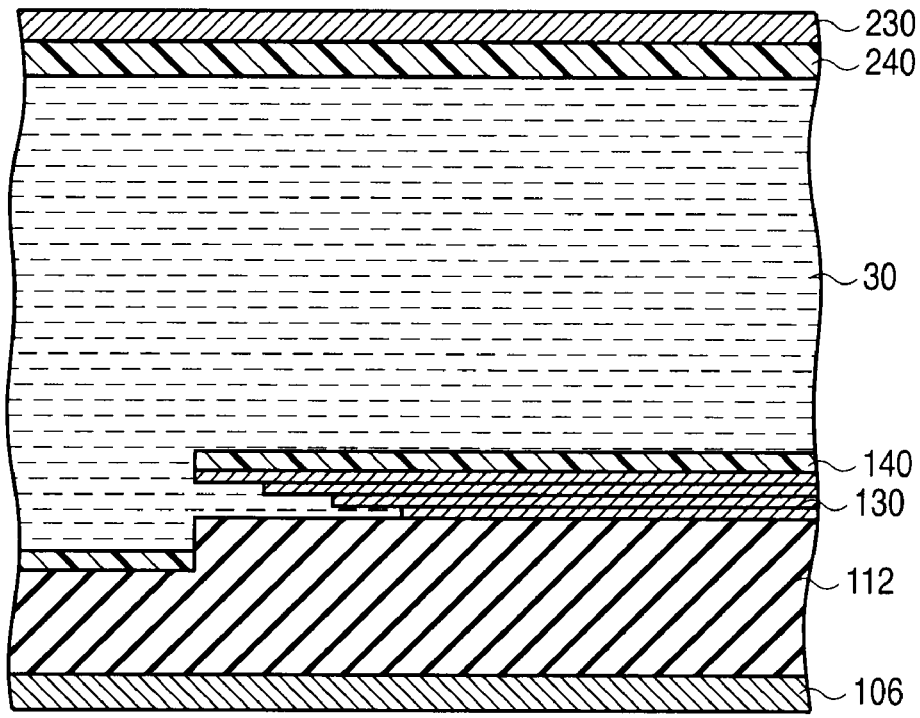
FIG. 6 is a cross-sectional view schematically showing the structure of a facing electrode shown in FIG. 4 and its surrounding areas according to another modified embodiment.
Figure 7:
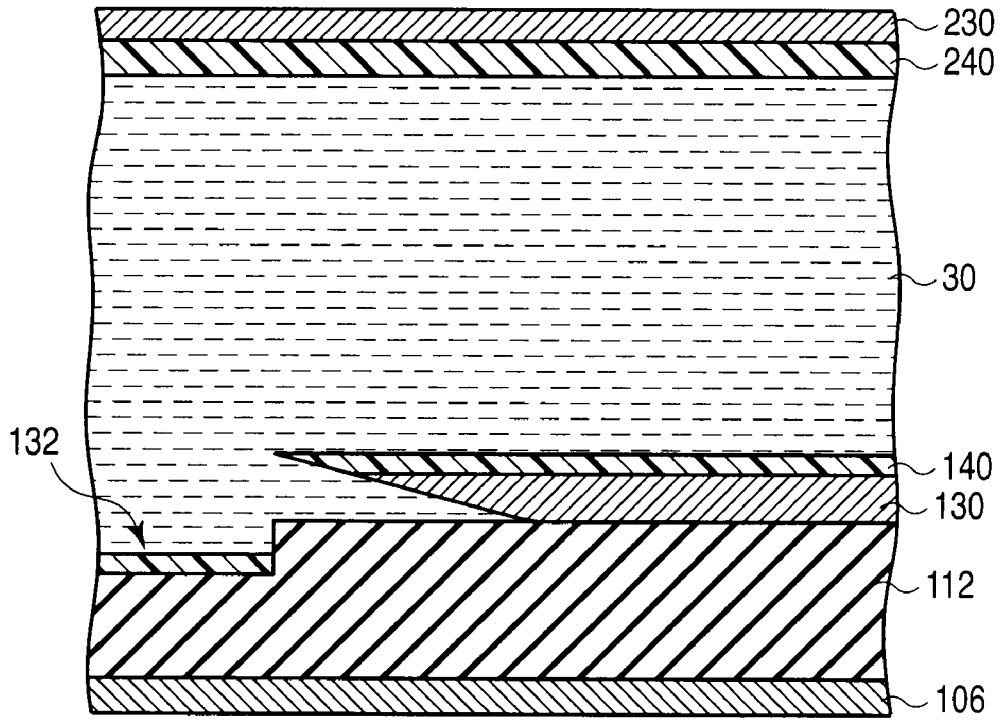
FIG. 7 is a cross-sectional view schematically showing the structure of a counter electrode shown in FIG. 4 and its surrounding areas according to another modified embodiment.
Figure 9:
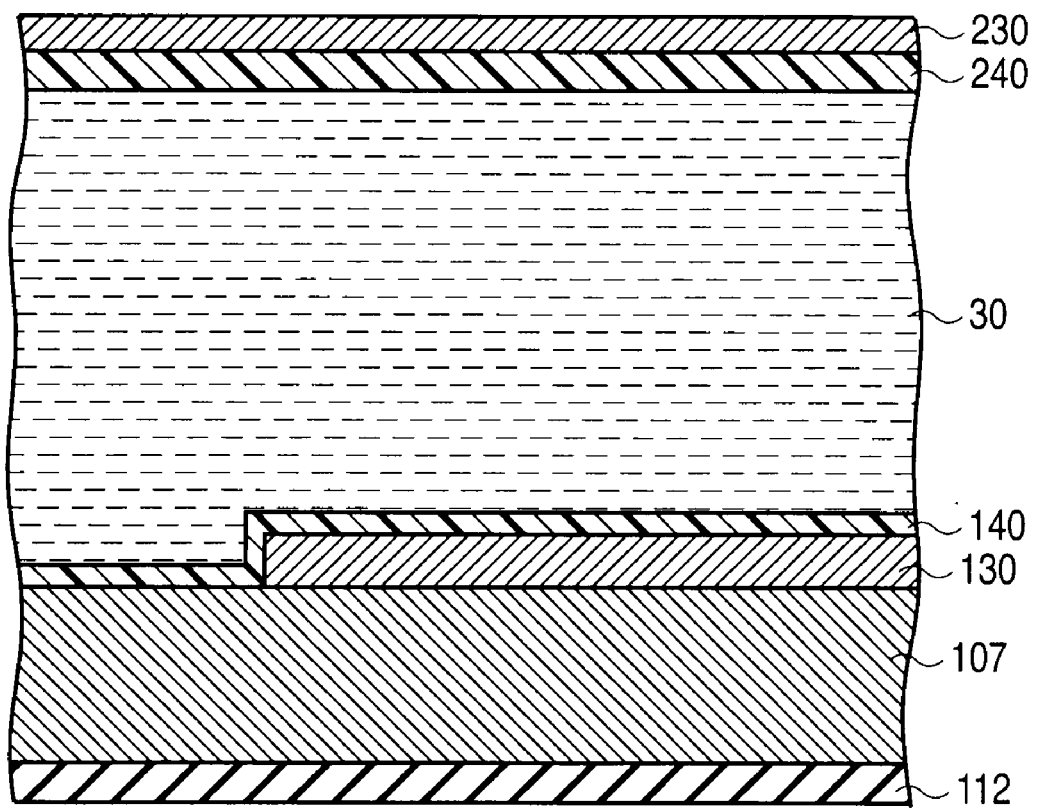
FIG. 9 is a cross-sectional view schematically showing the structure of a counter electrode and its surrounding areas according to a comparison example of the invention.

A patterning process such as gray scale exposure process and lift-off process using a positive-negative invert resist is selected as the method of forming the edge portion of the transition nucleus forming portion into a reverse taper. One example of the formation process is schematically showing in FIG. 8A to FIG. 8C. As shown in FIG. 8A, a resist 301 is coated on the insulating base layer 112, and the resist 301 is formed so that a part of the resist 301 has a stepped shape via a gray scale exposure process. As illustrated in FIG. 8B, a pixel electrode 130 is deposited. Thereafter, as seen from FIG. 8C, the resist is solved and removed via a lift-off process so that a part of the pixel electrode 130 is formed into a reverse taper shape. According to another formation process, adhesion of the pixel electrode 130 and the insulating base layer 112 is optimized. In this way, the pixel electrode 130 is formed into a desired reverse taper shape by side etching effect in an etching process. As shown in FIG. 5, a portion 132 having no pixel electrode 130 on the insulating base layer 112 may be formed into a thin stepped shape via O2 ashing and UV/O3 dry cleaning treatment.

As depicted in FIG. 2 and FIG. 3, the front substrate 20 comprises a transparent substrate 200 such as glass substrate, for example. The substrate 200 is arranged to face the surface where an orientation film 140 of the backside substrate 10 is formed. The facing surface of the substrate 200 facing the backside substrate 10 is formed with a common electrode 230 used as a counter electrode. For example, indium tin oxide (ITO), indium zinc oxide (IZO), tin oxide doped with antimony oxide and fluorine or a transparent conductor such as organic conductive polymer are usable as the common electrode 230.

The common electrode 230 is covered with an orientation film 240. The orientation film 240 is arranged separating from the orientation film 140 positioned on the pixel electrode 130 via a spacer (not shown). For example, a resin such as polyimide is usable as the material for the orientation film 240. An alignment treatment such as rubbing is carried out with respect to the orientation film 240. An alignment treatment of determining a rise direction of liquid crystal molecule 300 in the film surface, for example, rubbing treatment is selected. If the rubbing treatment is carried out as the alignment treatment, the direction shown by the arrow in FIG. 1 is set as a rubbing direction.

A frame-like bonding agent layer (not shown) is interposed between the backside substrate 10 and the front substrate 20. Particle spacers are interposed inside the frame formed with the bonding agent layer between the backside substrate 10 and the front substrate 20. The facing surface of at least one of the backside substrate 10 and the front substrate 20 is formed with a pillar spacer. These spacers perform a function of keeping constant the thickness of the space surrounded by the backside substrate 10, the front substrate 20 and the bonding layer.

The liquid crystal layer 30 is formed of a liquid crystal material, which is positive in dielectric anisotropy and refractive anisotropy. While, voltage is applied between the pixel electrode 130 and the common electrode 230, the liquid crystal material forms a bend alignment. Typically, a switch is made between a first value that the absolute value of voltage applied between the pixel electrode 130 and the common electrode 230 is larger than zero and a second value larger than the first value. In this way, brightness display and dark display are switched. According to this embodiment, the first value may be zero; therefore, the first value includes zero. Hereinafter, a state that the absolute value of the applied voltage is set as the first value calls an off state, and a state that the absolute value of the applied voltage is set as the second value calls an on state.

In FIG. 2 and FIG. 3, arrangement of the liquid crystal molecule 300 forming a bend alignment is illustrated as a 45° projection image to paper. In the on state, the tilt angle of the liquid crystal molecule in the vicinity of the orientation films 140 and 240 becomes large as compared with the off state.

The optical compensation film 40 comprises a biaxial film, for example. The optical compensation film 40 includes a uniaxial compound having negative refractive anisotropy, for example, an optical anisotropic layer formed in such a manner that a discotic liquid crystal compound is hybrid-aligned.

An optical axis of the uniaxial compound included in the optical compensation film 40 on the substrate 100 is approximately parallel with an optical axis in the on state of the liquid crystal molecule 300 positioned near the backside substrate 10 on the side of the substrate 100. On the side opposite to there, the foregoing optical axis is approximately parallel with an optical axis in the on state of the liquid crystal molecule 300 positioned at the intermediate portion between the backside substrate 10 and the front substrate 20. An optical axis of the uniaxial compound included in the optical compensation film 40 on the substrate 200 is approximately parallel with an optical axis in the on state of the liquid crystal molecule 300 positioned near the front substrate 20 on the side of the substrate 200. On the side opposite to there, the foregoing optical axis is approximately parallel with an optical axis in the on state of the liquid crystal molecule 300 positioned at the intermediate portion between the backside substrate 10 and the front substrate 20. The sum of retardation of these optical compensation filters 40 is set to an approximately equal value of retardation in the on state of the liquid crystal layer 300.

The polarizer 50 is arranged so that the transmission axis is mutually perpendicular. Each polarizer 50 is arranged so that the transmission axis is made at an angle of about 45° to the X and Y directions.

A backlight (not shown) is arranged to illuminate the backside substrate 10 of the liquid crystal display panel 1.

In the foregoing liquid crystal display device, voltage is applied to the pixel electrode 130, the common electrode 230 and the reference wiring 106 from an initialization voltage source 60, as shown in FIG. 4. For example, a first AC voltage of ±5V is applied to the pixel electrode 130 from the initialization voltage source 60. A second AC voltage of ±15V is applied to the common electrode 230 in a phase reverse to the first AC voltage. The reference wiring 106 is kept to a third voltage of 0V. Therefore, in the liquid crystal layer 30, a vertically electric field is formed between the pixel electrode 130 and the common electrode 230. In addition, a horizontally electric field is formed between the pixel electrode 130 the reference wiring 106. A transition nucleus is formed in the vicinity of the transition nucleus forming portion in the liquid crystal layer 30 of each pixel by the foregoing electric fields. Liquid crystal is rapidly transferred from a splay alignment state to a bend alignment state. Thereafter, an image signal is supplied to the signal line 108, and further, a scanning signal is supplied to the scanning line 104 so that an image is displayed on the liquid crystal panel 1.

In this embodiment, the structure of a normally white drive liquid crystal panel 1 is described. The liquid crystal panel 1 may be designed to make a normally block drive. In addition, the configuration of compensating the on state is employed. In this case, the configuration of compensating the off state may be employed.

The embodiment of the invention has the following structure. Specifically, the edge portion of transition nucleus forming portion 131 is formed into a reverse taper shape while the surface facing the liquid crystal layer 30 is kept flat. Namely, the transition nucleus forming portion 131 is gradually made thin toward the tip end. Thus, the field strength by the shape of the electrode is not uniform in the transition nucleus forming portion provided in the pixel electrode 130. An alignment state of the liquid crystal molecule 300 near the reverse taper electrode is easy to become unstable as compared with a bulk alignment state of the liquid crystal layer 30. For this reason, it is easy to form alignment distortion. As a result, it is possible to perform high-seed transition from a splay alignment to a bend alignment of all pixels.

In FIG. 1 to FIG. 5, there is shown the structure in which the transition nucleus forming portion 131 is provided around the pixel. The transition nucleus forming portion 131 may be provided in an opening in the pixel.

FIG. 1 to FIG. 5 shows an active matrix liquid crystal display device. For example, other drive type such as a simple matrix may be employed as the liquid crystal display device. The drive type of the liquid crystal display device is not specially limited.

EMBODIMENTS

A liquid crystal display device according to various embodiments of the invention will be hereinafter described.

Embodiment 1

According to the embodiment 1, the OCB mode liquid crystal display device shown in FIG. 1 to FIG. 5 was manufactured using the following method. In this embodiment, the outer surface of the backside substrate 10 was not provided with the optical compensation film 40. The outer surface only of the front substrate 20 was not provided with the optical compensation film 40.

The structure from an under coat layer 101 to the pixel electrode 130 was deposited on a glass substrate 100 having a thickness of 0.5 mm, and then, formed via a photolithography process. In this case, indium tin oxide (ITO) was used as the pixel electrode 130, MoW was used as a reference wiring 106, and a transparent acrylate resin (thickness: 1.5 μm) was used as an insulating base layer 112. A common electrode 230 was formed on a glass substrate 200 having a thickness of 0.5 mm.

In this case, the pixel electrode had a rectangular shape, and the pitch in the X direction was set to 82 μm while the pitch in the Y direction was set to 246 μm. Resist patterning was carried out using a SU-8 resist made by Microchem company via a gray scale exposure process. Then, indium tin oxide (ITO) was deposited as the pixel electrode 130 having a thickness 1000 Å via sputtering, and thereafter, lifted off. As shown in FIG. 4, the edge portion of a transition nucleus pattern of the pixel electrode was formed into a reverse taper, and the edge angle θ was 30 degrees.

An optoma-AL 3456 made by JSR Kabushiki Kaisha was coated on the pixel electrode 130 and the common electrode 230 via spin coating to form a polyimide resin layer having a thickness of 0.1 µm. A rubbing treatment was carried out with respect to each polyimide resin layer along the direction shown in FIG. 1. In this way, orientation film 140 and 240 were obtained.

A thermosetting bonding agent was dispensed on the main surface of the backside substrate 10 to surround the orientation film 140. A frame formed by the bonding agent was formed with an opening used as a liquid crystal injection inlet. The bonding agent was temporarily dried, and thereafter, a silver paste was dispensed on a transfer pad (not shown).

Then, particle spacers having a diameter of 7.0 µm were sprayed on the orientation film 240. In this case, the particle spacer was sprayed as the spacer; however, in place of the particle spacer, a pillar spacer may be formed using a photosensitive resin.

Thereafter, the backside substrate 10 and the front substrate 20 were bonded together so that the orientation films 140 and 240 faced each other and the rubbing direction became equal, and then, heated. In the foregoing manner, a free cell was obtained.

A nematic liquid crystal compound having positive dielectric anisotropy was injected to the free cell via a dip process.

Then, an ultraviolet thermosetting resin was dispensed to the liquid crystal injection inlet, and thereafter, ultraviolet rays were irradiated thereto. A polarizer 50 was bonded to the outer surface of the backside substrate 10, and an optical compensation film 40 and a polarizer 50 were successively bonded to the outer surface of the front substrate 20.

The optical compensation film 40 used herein includes the following optical anisotropy layer. According to the optical anisotropy layer, a bend alignment is formed so that an optical axis of a discotic liquid crystal compound changes in in-plane vertical to the X direction. The maximum main normal speed direction of the optical compensation film 40 is parallel with the thickness direction. The minimum main normal speed direction of the optical compensation film 40 is parallel with the X direction. The remaining main normal speed direction is parallel with the Y direction.

The liquid crystal display panel 1 thus obtained was incorporated into a backlight unit (not shown), and thereby, the liquid crystal display device shown in FIG. 1 to FIG. 4 was manufactured.

The liquid crystal display device was observed in the following condition. Specifically, AC voltage of ±5V was applied; inversion-phase AC voltage of ±15V was applied to the common electrode 230, and 0V was applied to the reference wiring 106 under room temperature and in a state that the backlight was lighted. In this way, the pixel was observed using a microscope. As a result, an average time required for a change from a colored state showing a splay alignment to a non-colored state showing a bend alignment was 0.10 second per pixel. Via repeating measurements, an average spent time until color change is completed on the entire screen was 0.20 seconds.

Embodiment 2

According to a method similar to the described in the embodiment 1, a liquid crystal display device shown in FIG. 1 to FIG. 3 and FIG. 6 was manufactured. As seen from FIG. 6, the reverse taper was formed into a step shape. According to the same method as carried out in the embodiment 1, the pixel was observed using a microscope under room temperature and in a state that the backlight is lighted. As a result, an average time required for a change from a colored state showing a splay alignment to a non-colored state showing a bend alignment was 0.15 second per pixel. Via repeating measurements, an average spent time until color change is completed on the entire screen was 0.25 seconds.

Embodiment 3

According to a method similar to the described in the embodiment 1, a liquid crystal display device shown in FIG. 1 to FIG. 3 and FIG. 6 was manufactured.

According this embodiment, an organic conductive polymer transparent electrode having a thickness of 2000 Å was formed in the following manner. Specifically, the pixel electrode 130 was converted to a tin oxide of a conductive metal oxide in a manner that tin chloride is heated using a solution containing hydroxypropyl cellulose as organic polymer component and tin oxide as inorganic sol component. Resist patterning was carried out using an AZP 4903 resist made by Clariant Japan company, and etching was carried out using hydrochloric/nitric acid etching solution. As seen from FIG. 6, the edge portion of the transition nucleus forming portion of the pixel electrode 130 was formed into a reverse taper shape. In addition, the pixel electrode 130 was formed into a step shape toward the tip end so that the thickness is decreased. An edge angle θ was 40 degrees. A portion of the insulating base layer 112 where the pixel electrode 130 is not formed was formed into a step shape because the thickness is made thin via 02 ashing treatment.

In the liquid crystal display device, transition spent time from a splay alignment state to a bend alignment state was measured according to the same method as carried out in the embodiment 1. As a result, an average transition spent time per pixel was 0.08 second. Via repeating measurements, an average spent time until color change is completed on the entire screen was 0.15 seconds.

Embodiment 4

According to the method similar to the embodiment 1, a liquid crystal display device shown in FIG. 1 to FIG. 3 and FIG. 7 was manufactured.

According to the embodiment 4, a transparent acrylate resin was used as the insulating base layer 112. The insulating base layer having a thickness of 1.5 µm was formed, and thereafter, a hydrophilicity treatment was carried out with respect to the surface using titanium oxide photo catalyst. Then, the pixel electrode 130 was formed in the following manner. Specifically, indium zinc oxide (IZO) was deposited to have a thickness of 1500 Å via sputtering. Thereafter, resist patterning was carried out via normal exposure process using an AZP 4903 resist made by Clariant Japan company. Then, etching was carried out using hydrochloric/nitric acid etching solution. The hydrophilicity treatment was previously carried out with respect to the insulating base layer 112, and thereby, surface energy on the surface changed. The edge portion of the transition nucleus pattern of the pixel electrode 130 was formed into a reverse taper shape by the effect of facilitating sink of the hydrochloric/nitric acid etching solution. An edge angle was 35 degrees. A portion of the insulating base layer 112 where the pixel electrode 130 was not formed is made thin via 02 ashing treatment; as a result, a step shape was obtained.

In the liquid crystal display device, transition spent time from a splay alignment state to a bend alignment state was measured according to the same method as carried out in the embodiment 1. As a result, an average transition spent time per pixel was 0.05 second. Via repeating measurements, an average spent time until color change is completed on the entire screen was 0.10 seconds.

COMPARISON EXAMPLE

According to the method similar to the embodiment 1, a liquid crystal display device shown in FIG. 1 to FIG. 3 and FIG. 9 was manufactured.

According to the comparison example, the pixel electrode 130 was formed in the following manner. Specifically, an indium tin oxide (ITO) was deposited to have a thickness of 1000 Å via sputtering, and thereafter, resist patterning was carried out using a TSMR-V90 resist made by Tokyo Oka Kogyo company. Then, the resultant indium tin oxide (ITO) was etched using dry etching. As seen from the edge portion of a transition nucleus pattern of the pixel electrode 130 was formed into an approximately vertical shape.

In the liquid crystal display device, transition spent time from a splay alignment state to a bend alignment state was measured according to the same method as carried out in the embodiment 1. As a result, an average transition spent time per pixel was 0.5 second. An average spent time until transition is completed on the entire screen was 0.8 seconds.

In the liquid crystal display device, each configuration of element and drive circuit is simplified, and it is possible to easily perform transition from a splay alignment to a bend alignment in all pixels. In addition, numerical aperture and contrast can be improved.

As described above, it is possible to provide a liquid crystal display device, which has simple element and drive circuit configuration, and performs transition from a splay alignment to a bend alignment in all pixels, and further, improves numerical aperture and contrast.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
a first substrate structure including a first insulating substrate, a first electrode, a second electrode arranged between the first electrode and the first insulating substrate, and an insulating base layer which is disposed between the first and the second electrodes, wherein the first electrode includes a base portion, an edge portion protruding from the base portion, and a flat first surface extending on the base portion and the edge portion, wherein the edge portion includes a tip end and is formed as a reverse taper shape gradually decreasing in its thickness toward the tip end from the base portion;
a second substrate structure including a second insulating substrate, and a third electrode which is so arranged on the second insulating substrate and includes a second surface so as to face the flat first surface of the first electrode; and
a liquid crystal layer which is so held between the flat first surface of the first electrode and the second surface of the third electrode so that the edge portion of the first electrode protrudes into the liquid crystal layer, the liquid crystal layer being subject to a phase transition from a first state to a second state when an initialization voltage is applied to the first to third electrodes, the edge portion of the first electrode forming a transition nucleus in the liquid crystal layer based on application of the initialization voltage.

2. The device according to claim 1, wherein the edge portion of the first electrode includes a taper surface inclined to the flat first surface at an edge angle which is 10 degrees or more and 60 degrees or less.

3. The device according to claim 1, wherein the first electrode is formed of an indium tin oxide (ITO), an indium zinc oxide (IZO), a tin oxide doped with antimony oxide and fluorine, or an organic conductive polymer.

4. The device according to claim 1, wherein the pixel base portion of the first electrode has a thickness of 500Å to 5000Å.

5. The device according to claim 1, wherein the liquid crystal layer includes OCB liquid crystal.

6. The device according to claim 1, wherein the edge portion has a taper surface on the side opposite to the flat first surface, and the first insulating substrate includes a surface including a first surface area which faces to the taper surface of the edge portion, a second surface area adjacent to the first surface area and a step formed between the first and second surface areas.

7. The device according to claim 1, wherein the first insulating substrate includes a surface on which the edge portion is formed, and orientation films are separately formed on the edge portion and the surface, respectively.

8. The device according to claim 1, wherein an edge space is formed between the edge portion of the first electrode and the first insulating substrate.

\* \* \* \* \*

UNITED STATES PATENT AND TRADEMARK OFFICE
CERTIFICATE OF CORRECTION

| | |
|---|---|
| PATENT NO. | : 8,218,115 B2 |
| APPLICATION NO. | : 12/211964 |
| DATED | : July 10, 2012 |
| INVENTOR(S) | : Yukio Kizaki et al. |

It is certified that error appears in the above-identified patent and that said Letters Patent is hereby corrected as shown below:

On the title page, Item 73, the Assignees information is incorrect. Item 73 should read as follows:

--(73) Assignees: Kabushiki Kaisha Toshiba, Tokyo (JP);
Japan Display Central Inc., Fukaya-shi (JP)--

Signed and Sealed this
Eighteenth Day of December, 2012

David J. Kappos
*Director of the United States Patent and Trademark Office*